United States Patent

Wedeen et al.

Patent Number: 5,359,269
Date of Patent: Oct. 25, 1994

[54] TORQUE OSCILLATION COMPENSATION USING TORQUE TRANSDUCER FEEDBACK

[75] Inventors: Robert S. Wedeen, Manhattan Beach; Gholam D. Goodarzi, Torrance, both of Calif.

[73] Assignee: Hughes Aircraft Company, Los Angeles, Calif.

[21] Appl. No.: 61,657

[22] Filed: May 13, 1993

[51] Int. Cl.$^5$ ............................................. H02P 7/00
[52] U.S. Cl. ..................................... 318/432; 318/460
[58] Field of Search ................................ 318/432, 460

[56] References Cited

U.S. PATENT DOCUMENTS

| | | | |
|---|---|---|---|
| 4,716,347 | 12/1987 | Fujimoto | 318/460 |
| 4,891,764 | 1/1990 | McIntosh | 318/432 X |
| 4,980,623 | 12/1990 | Anton | 318/432 |
| 5,223,775 | 6/1993 | Mongeau | 318/432 |

*Primary Examiner*—William M. Shoop, Jr.
*Assistant Examiner*—Karen Masih
*Attorney, Agent, or Firm*—L. A. Alkov; W. K. Denson-Low

[57] ABSTRACT

A torque oscillation compensation system and circuit that uses torque transducer feedback derived from an output shaft of an electric vehicle motor to compensate for electrical motor pulsations such as are experienced in an electric vehicle. A torque input source provides a torque input signal, that is coupled to a summing circuit. A controller is coupled to the summing circuit, and power switching circuitry is coupled between the controller and the electric motor. A torque transducer is coupled to the output shaft of the motor to sense torque pulsations. An oscillation compensation circuit is coupled between the torque transducer and the summing circuit that generates a feedback compensation signal that is combined with the torque input signal to compensate for output shaft oscillators. The oscillation compensation circuit comprises a loop amplifier having a predetermined transfer function and is coupled to the torque transducer, and AC coupling circuitry, typically comprising a plurality of coupling capacitors, coupled between the loop amplifier and the summing circuit. A limiter circuit comprising first and second oppositely coupled diodes may be coupled to a point between the AC coupling capacitors. The oscillation compensation circuit may include a cascade amplifier coupled to the AC coupling circuitry. Compensation for the torque pulsations is provided by utilizing the AC component of a signal derived from the torque transducer that is coupled to the drive shaft of the electric motor as a feedback signal from which compensation commands are derived. This AC-coupled signal is fed back with proper amplitude and phase shift to modulate and compensate the motor current and/or slip and/or speed and/or commutating angle and/or field current to eliminate torque fluctuations of the drive train of the vehicle. The present invention eliminates these unwanted torque pulsations over all modes of propulsion operation.

18 Claims, 2 Drawing Sheets

TORQUE OSCILLATION COMPENSATION USING TORQUE TRANSDUCER FEEDBACK

BACKGROUND

The present invention relates generally to torque oscillation compensation for electric vehicle motors, and more particularly, to a torque oscillation compensation system and circuit that uses torque transducer feedback derived from an electric vehicle motor.

Electric drive train systems can exhibit torque pulsations. These torque pulsations can cause motor bearing and tire wear. The torque pulsations can also cause undesirable drive train/vehicle vibration. Prior an devices for use in stabilizing electric vehicles have attempted to implement vehicle stabilization using gyroscopic compensation. However, gyroscopic techniques have not yet proved to be feasible for use on electric vehicles.

Accordingly, it is an objective of the present invention to provide for a torque oscillation compensation circuit that uses torque transducer feedback derived from an electric vehicle motor.

SUMMARY OF THE INVENTION

In order to provide for the above and other objectives, the present invention comprises a torque oscillation compensation system and circuit that uses torque transducer feedback derived from the output shaft of an electric vehicle motor to compensate for electrical motor pulsations.

More specifically, the present invention comprises a torque oscillation compensation system for use with an electric motor having an output shaft. The system comprises a torque input source for providing a command torque input signal, a summing circuit having an output that has one input coupled to the torque input source, a controller coupled to the output of the summing circuit, and power switching circuitry coupled between the controller and the electric motor. A torque transducer is coupled to the output shaft of the electric motor and is adapted to sense torque pulsations present in output shaft of the electric motor. An oscillation compensation circuit is coupled between the torque transducer and a second input of the summing circuit that generates a feedback compensation signal that is combined with the commanded torque input signal that compensates for oscillators present in the output shaft of the electric motor.

The present invention thus provides compensation for the torque pulsations by utilizing the AC component of a signal derived from the torque transducer that is coupled to the drive shaft of the electric motor as a feedback signal from which compensation commands are derived. This AC-coupled signal is fed back with proper amplitude and phase shift to modulate and compensate the motor current and/or slip and/or speed and/or commutating angle and/or field current to eliminate torque fluctuations of the drive train of the vehicle. The present invention eliminates these unwanted torque pulsations over all modes of propulsion operation.

The oscillation compensation circuit comprises a loop amplifier having a predetermined transfer function coupled to the torque transducer, and AC coupling means coupled between the loop amplifier and the summing circuit. The AC coupling means typically comprises a plurality of coupling capacitors. In a specific reduced to practice embodiment of the present invention, a limiter circuit is coupled to a point between the AC coupling capacitors, which comprises first and second oppositely coupled diodes. The oscillation compensation circuit may also comprise a cascade amplifier coupled to the AC coupling means.

The torque oscillation compensation circuit of the present invention comprises a torque transducer coupled to the output shaft of the electric motor which senses torque pulsations, a summing circuit having an output and having one input coupled to receive a torque input signal, and a oscillation compensation circuit coupled between the torque transducer and a second input of the summing circuit that generates a feedback compensation signal that is combined with the torque input signal that compensates for oscillations present in the output shaft of the electric motor.

Applications of the present invention include stabilizing drive trains that exhibit torque pulsations, at any speed, in motoring or regeneration and include power control systems, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
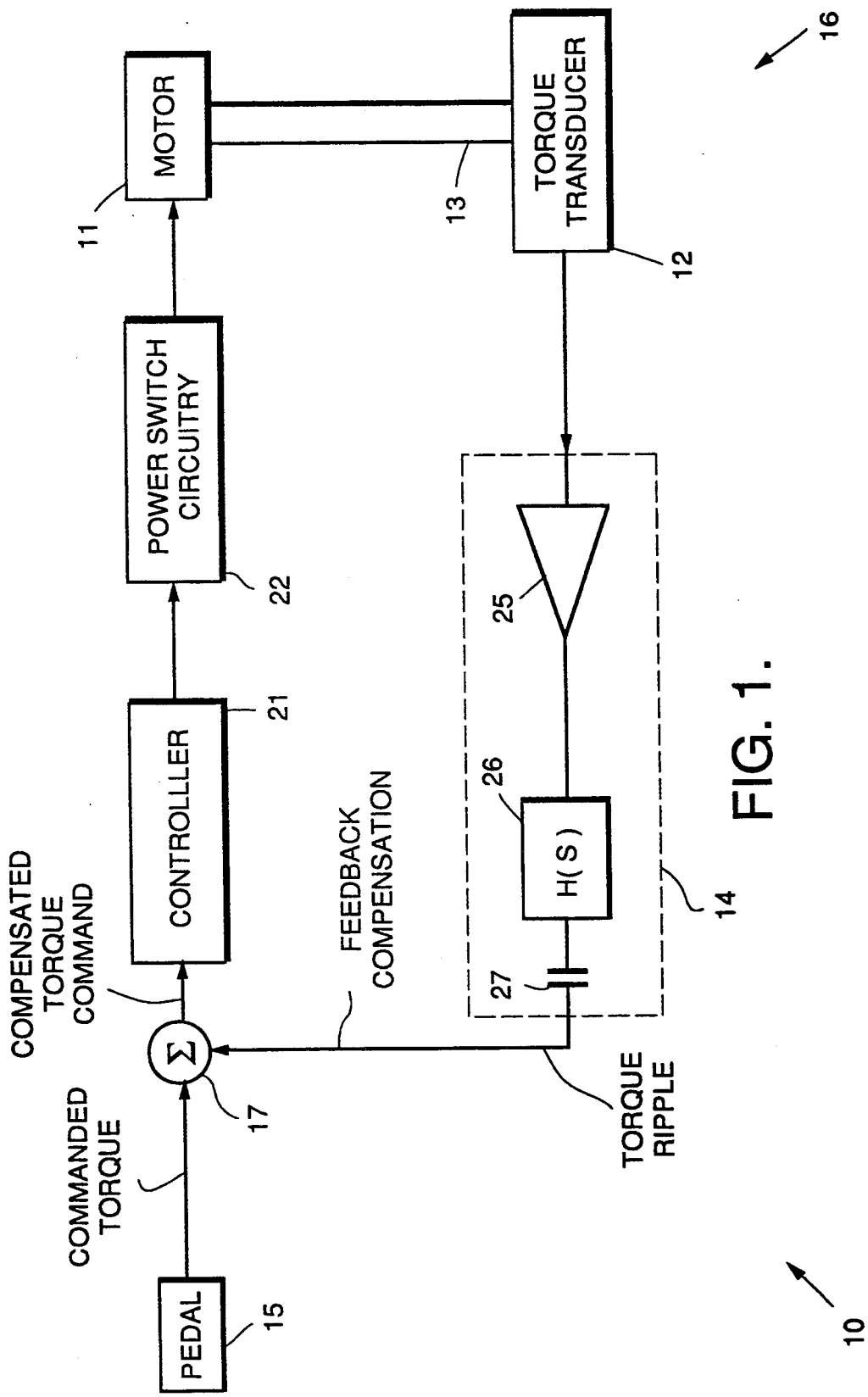
FIG. 1 illustrates a block diagram showing a torque oscillation compensation system using torque transducer feedback in accordance with the principles of the present invention.

Referring to the drawing figures, FIG. 1 illustrates a block diagram showing a torque oscillation compensation system 10 using torque transducer feedback in accordance with the principles of the present invention. The torque oscillation compensation system 10 is employed with an electric motor 11 of an electric vehicle 16 and is comprised of a torque transducer 12 that is coupled to a drive shaft 13 that is coupled to the motor 11. A torque signal derived from an accelerator pedal 15 of the vehicle 16 is coupled by way of one input of a summing circuit 17 to a controller 21. The controller 21 is coupled by way of power switching circuitry 22 to the motor 11 and applies appropriate signals thereto that cause the motor 11 to accelerate and decelerate and to run in forward and reverse directions.

An AC coupled loop amplifier circuit 14 is coupled between the torque transducer 12 and a second input of the summing circuit 17. The AC coupled loop amplifier circuit 14 is comprised of an amplifier 25, a transfer function circuit 26 and a capacitor 27 that implements the AC coupling of a feedback signal derived from the torque transducer 12. The torque transducer 12 samples the torque ripple experienced by the motor 11 and this torque ripple signal is amplified and phase shifted by the AC coupled loop amplifier circuit 14. The AC coupled amplifier 14 provides the desired torque ripple signal which, when combined with the torque signals derived from the accelerator pedal 15 in the summing circuit 17, substantially reduces or eliminates torque fluctuations experienced by the motor 11. The output of the summing circuit 17 comprises a compensated torque command that is applied to the motor 11 and which substantially reduces or eliminates torque fluctuations therein.

Torque at the drive shaft 13 of the motor 11 is converted to an electrical signal by use of the torque transducer 12. Undesirable torque ripple appears as an AC component of the output signal of the torque transducer 12 and is AC coupled to the loop amplifier circuit 14. The loop amplifier 14 is designed to have the appropriate gain and phase shift that provides sufficient negative feedback for elimination of the torque pulsations. The loop amplifier circuit 14 output is summed with the main torque command input derived from the accelerator pedal 15 so that it can modulate and compensate the motor commands to eliminate the torque pulsation.

Figure 2:
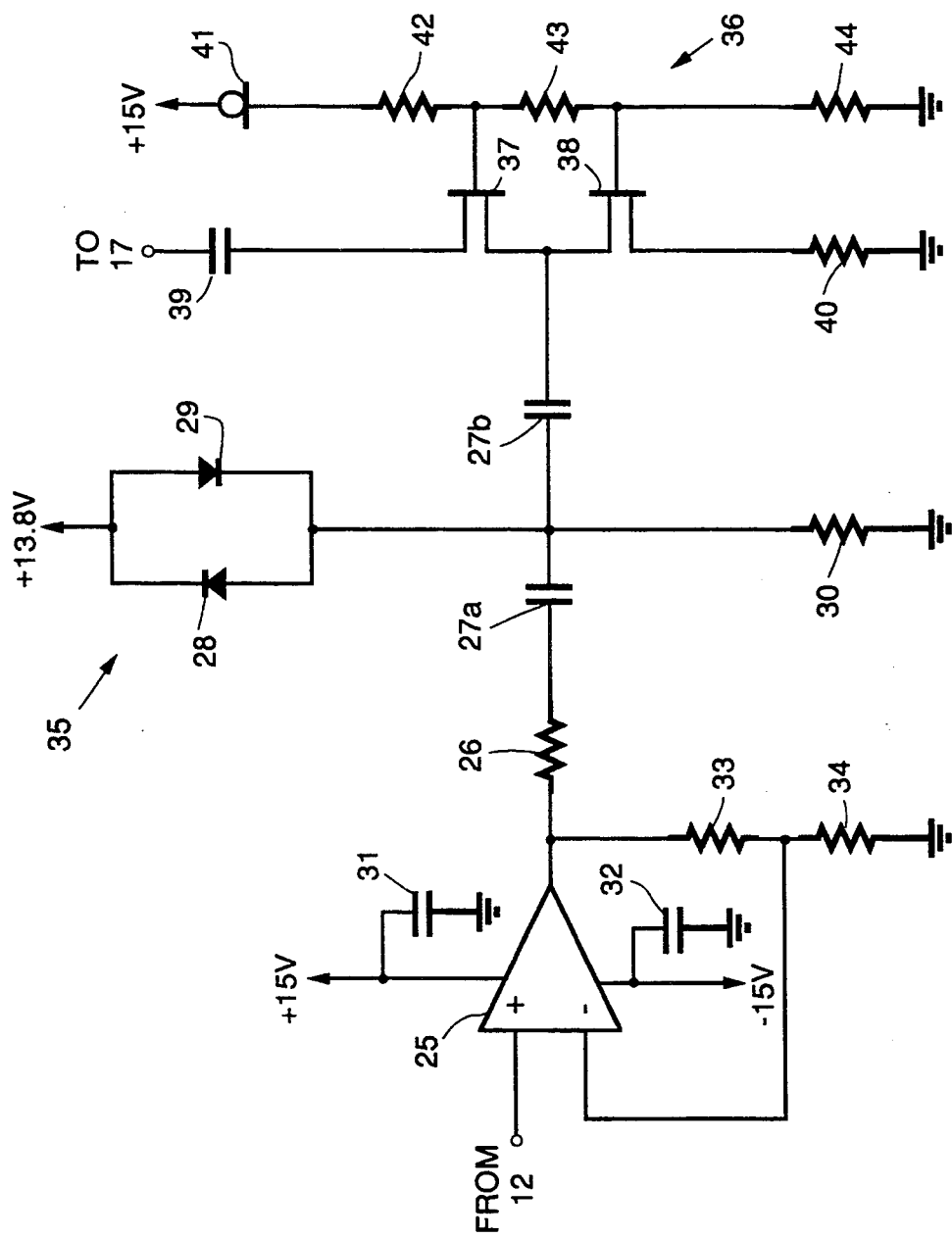
FIG. 2 is a detailed diagram illustrating an embodiment of the loop amplifier employed in the torque oscillation compensation circuit of FIG. 1 that has been reduced to practice.

Referring to FIG. 2, it shows a detailed diagram illustrating an embodiment of the loop amplifier circuit 14 employed in the torque oscillation compensation circuit 10 shown in FIG. 1 that has been reduced to practice. The loop amplifier circuit 14 comprises the amplifier 25, which may be comprised of a model 324 amplifier, manufactured by National Semiconductor, for example. Two filter capacitors 31, 32 are employed, and two resistors 33, 34 set the gain of the amplifier 25, taken from a point between the two resistors 33, 34 which are coupled between the output of the amplifier 25 and ground. The two filter capacitors 31, 32 are coupled between the amplifier 25 and +15 volt and −15 volt power supplies, respectively.

The output of the amplifier 25 is coupled by way of a third resistor 26 through two AC coupling capacitors 27a, 27b to a cascade amplifier 36 employing two FET transistors 37, 38. Two diodes 28, 29, such as model 1N4003 diodes are coupled between a +13.8 volt power source and a point between the two AC coupling capacitors 27a, 27b. The two diodes 28, 29 form a limiter circuit 35. A fourth resistor 30 is also coupled from a point between the two AC coupling capacitors 27a, 27b and ground. The cascade amplifier 36 is also comprised of a constant current diode 41, such as a model 1N5305 diode, for example, which is coupled between a +15 volt power supply and ground by way of a voltage divider network 45 comprising three resistors 42, 43, 44.

The two FET transistors 37, 38 are coupled to the summing circuit 17 by way if a capacitor 39 and ground by way of a fourth resistor 40. The gates of the FET transistors 37, 38 are coupled to points taken between the respective first and second resistors 41, 42 and second and third resistors 42, 43 of the voltage divider network 45.

In operation, the circuit 14 of FIG. 2 operates as follows. The shaft torque signal from the torque transducer 12 is amplifier by the amplifier 25 and then AC coupled to the cascade amplifier 36 which provides for negative feedback and additional gain. The signal is then AC coupled through the capacitor 39 to the summing circuit 17 where it compensates the input torque signal to eliminate torque pulsations in the motor 11.

For the purpose of completeness, the following is a listing of the values for each of the resistors and capacitors shown in FIG. 2: resistor 30=200 Kohms; resistor 33=10 Kohms; resistor 34=5.1 Kohms; resistor 40=2.4 Kohms; resistor 42=1 Mohms; resistor 43=1 Mohms; resistor 44=1 Mohms; capacitor 27a=160 microfarads 50 volts; capacitor 27b=160 microfarads 50 volts; capacitor 31=0.1 microfarads; capacitor 32=0.1 microfarads; and capacitor 39=5 microfarads.

Thus there has been described a new and improved torque oscillation compensation system and circuit that uses torque transducer feedback derived from an electric vehicle motor. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A torque oscillation compensation system for use with an electric motor having an output shaft, said system comprising:

a torque input source for providing a command torque input signal;

a summing circuit having an output and having one input coupled to the torque input source;

a controller coupled to the output of the summing circuit;

power switching circuitry coupled between the controller and the electric motor;

a torque transducer coupled to the output shaft of the electric motor for sensing torque pulsations present in output shaft of the electric motor; and an oscillation compensation circuit coupled between the torque transducer and a second input of the summing circuit that generates a feedback compensation signal that is combined with the commanded torque input signal that compensates for oscillations present in the output shaft of the electric motor.

2. The system of claim 1 wherein the oscillation compensation circuit comprises:

a loop amplifier having a predetermined transfer function coupled to the torque transducer; and AC coupling means coupled between the loop amplifier and the summing circuit.

3. The system of claim 2 wherein the AC coupling means comprises a plurality of coupling capacitors.

4. The system of claim 3 wherein the oscillation compensation circuit further comprises a limiter circuit coupled to a point between the AC coupling capacitors.

5. The system of claim 3 wherein the limiter circuit comprises first and second oppositely coupled diodes.

6. The system of claim 3 wherein the oscillation compensation circuit further comprises a cascade amplifier coupled to the AC coupling means.

7. In a torque oscillation compensation system for use with an electric motor having an output shaft, and wherein the system comprises a torque input source for providing a command torque input signal, a summing circuit having an output and having one input coupled to the torque input source, a controller coupled to the output of the summing circuit, and power switching circuitry coupled between the controller and the electric motor, wherein the improvement comprises:

a torque transducer coupled to the output shaft of the electric motor for sensing torque pulsations present in output shaft of the electric motor; and an oscillation compensation circuit coupled between the torque transducer and a second input of the summing circuit that generates a feedback compensation signal that is combined with the commanded torque input signal that compensates for oscillations present in the output shaft of the electric motor.

8. The system of claim 7 wherein the oscillation compensation circuit comprises:
   a loop amplifier having a predetermined transfer function coupled to the torque transducer; and
   AC coupling means coupled between the loop amplifier and the summing circuit.

9. The system of claim 8 wherein the AC coupling means comprises a plurality of coupling capacitors.

10. The system of claim 9 wherein the oscillation compensation circuit further comprises a limiter circuit coupled to a point between the AC coupling capacitors.

11. The system of claim 9 wherein the limiter circuit comprises first and second oppositely coupled diodes.

12. The system of claim 9 wherein the oscillation compensation circuit further comprises a cascade amplifier coupled to the AC coupling means.

13. A torque oscillation compensation circuit for use with an electric motor having an output shaft, said circuit comprising:
   a torque transducer coupled to the output shaft of the electric motor for sensing torque pulsations present in output shaft of the electric motor;
   a summing circuit having an output and having one input coupled to receive a torque input signal; and
   an oscillation compensation circuit coupled between the torque transducer and a second input of the summing circuit that generates a feedback compensation signal that is combined with the torque input signal that compensates for oscillations present in the output shaft of the electric motor.

14. The system of claim 13 wherein the oscillation compensation circuit comprises:
   a loop amplifier having a predetermined transfer function coupled to the torque transducer; and
   AC coupling means coupled between the loop amplifier and the summing circuit.

15. The system of claim 14 wherein the AC coupling means comprises: a plurality of coupling capacitors.

16. The system of claim 15 wherein the oscillation compensation circuit further comprises a limiter circuit coupled to a point between the AC coupling capacitors.

17. The system of claim 15 wherein the limiter circuit comprises first and second oppositely coupled diodes.

18. The system of claim 15 wherein the oscillation compensation circuit further comprises a cascade amplifier coupled to the AC coupling means.

* * * * *